United States Patent [19]
Kato et al.

[11] Patent Number: 5,179,855
[45] Date of Patent: Jan. 19, 1993

[54] FILM MAGAZINE FORMING APPARATUS

[75] Inventors: Toshio Kato; Yorikatu Miyazawa; Osamu Shibazaki; Yoshihiko Goda, all of Hino, Japan

[73] Assignee: Konica Corporation, Tokyo, Japan

[21] Appl. No.: 688,045

[22] Filed: Apr. 19, 1991

[30] Foreign Application Priority Data

Apr. 26, 1990 [JP] Japan .................... 2-108829

[51] Int. Cl.⁵ ............................. B21D 51/26
[52] U.S. Cl. ........................... 72/401; 72/422; 29/806; 413/76
[58] Field of Search ............ 72/401, 422; 29/806, 29/773; 413/76, 71, 70

[56] References Cited

U.S. PATENT DOCUMENTS

| | | | |
|---|---|---|---|
| 382,537 | 5/1888 | Leavitt | 413/76 |
| 4,106,420 | 8/1978 | Takahashi | 413/70 |
| 4,891,089 | 1/1990 | Takahashi | 29/806 |
| 5,038,464 | 8/1991 | Suzuki | 29/806 |

FOREIGN PATENT DOCUMENTS 225822 8/1925 United Kingdom ............... 413/71

Primary Examiner—Daniel C. Crane
Attorney, Agent, or Firm—Frishauf, Holtz, Goodman & Woodward

[57] ABSTRACT

A film magazine forming apparatus forms a sheet having printing on a side thereof into an almost cylindrical shape. The film magazine formed into the almost cylindrical shape has separated lip portions for enabling a film to mvoe therethrough. The lip portions have a soft yarn mounted thereon. Transport apparatus transports the sheet to forming means including a core mold, an upper mold, and first and second side molds which form the sheet into an almost cylindrical shape with the printing on the side of the sheet forming an outer cylindrical surface of the almost cylindrical sheet. Transport apparatus transports the sheet with the printed side of the sheet being out of contact with the transport apparatus to prevent damage to the printing on the sheet. In addition, the core mold is used as a guide for transporting the almost cylindrical shape sheet to another operating position. A claw can be mounted on the core mold for transporting the thus formed almost cylindrical shape to another operational position.

4 Claims, 3 Drawing Sheets

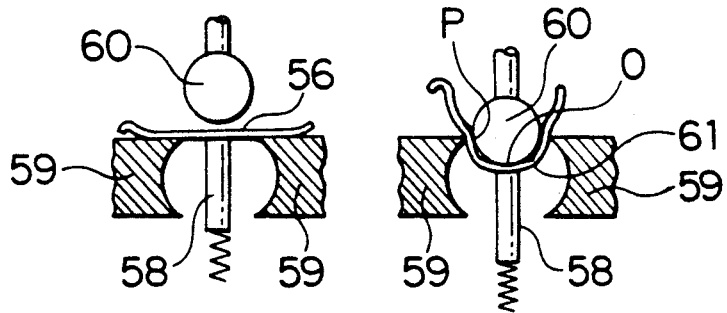
FIG. 5(a) PRIOR ART
FIG. 5(b) PRIOR ART
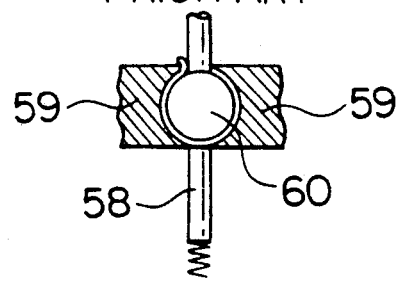
FIG. 5(c) PRIOR ART
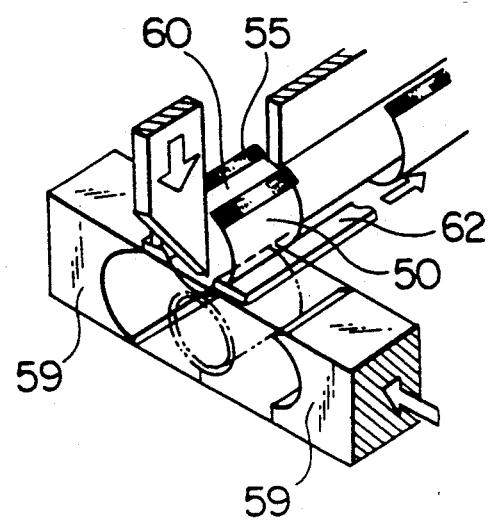
FIG. 6 PRIOR ART

FILM MAGAZINE FORMING APPARATUS

FIELD OF THE INVENTION

The present invention relates to a film magazine forming apparatus for forming the film magazine wherein a photographic film is to be loaded.

BACKGROUND OF THE INVENTION

A film magazine for use in photography usually has structure shown in FIG. 3.

In FIG. 3, 50 is a film magazine, 51 and 52 each represent a cap portion, 53 is a lip portion that is a film outlet, and 54 is a film.

In a film magazine having such a structure, a blank sheet that is sized to predetermined dimensions is formed to be boat-shaped, then a velvet ribbon 55 is pasted thereon as a light-shielding member, and then the blank sheet is rounded to be film magazine 50 shown in FIG. 3. After that, the rounded blank sheet is covered, at its both ends, with cap portions 51 and 52 for manufacturing. Incidentally, the velvet ribbon is usually blackened so that it may have a light-shielding function. In addition to the light-shielding function, the velvet ribbon is required to have softness so that it does not damage a film when the film is taken out or is rewound. Therefore, the velvet ribbon is made in a way wherein a soft pile yarn such as viscose acetate yarn or nylon yarn is crimpled and woven into a base cloth.

In a film magazine forming apparatus that rounds boat-shaped blank sheet 56 (FIG. 4) that is pasted with velvet ribbon 55, on the other hand, blank sheet 56 fed from the previous step on a one by one basis is fed by transport member 57 with a printed side of the blank sheet facing downward (velvet ribbon 55 facing upward and a printed side being kept in contact with a transport member slidingly) as shown in FIG. 4, and then is formed by the film magazine forming apparatus to be almost cylindrical as shown in FIGS. 5(a), 5(b) and 5(c).

Incidentally, in FIGS. 5(a), 5(b) and 5(c), the numeral 58 represents a supporting member for blank sheet 56, the numeral 59 represents a side mould for moulding use provided thereon with a concave portion 60 which is a core mould. Core mould 60 is positioned above side mould for moulding use 59 and supporting member 58, and as shown in FIGS. 5(b)-(c) to the blank sheet 56 is formed almost into a cylindrical shape by core mould 60 and by side mould for moulding use 59.

However, the film magazine forming apparatus having the structure stated above is faulty for the following reasons.

(1) Since the blank sheet 56 is transported, with its printed side facing downward, by the transport member 57 (velvet ribbon 55 facing upward and a printed side being kept in contact with a transport member slidingly), the printed side is rubbed while it is transported, resulting in damage thereon and the consequent reduction of commodity value of a film magazine.

(2) Since the blank sheet 56 is formed on a long fulcrum between point O where the blank sheet is sandwiched by supporting member 58 and core mould 60 and point P where the blank sheet touches the upper point of a concave portion of side mould for moulding use 59, bent portion 61 shown in FIG. 5 (b) tends to be caused to form respectfully in the area between point P and point O and the permanent set of this bent portion 61 stays even after the blank sheet is formed as shown in FIG. 5 (c), resulting in an imperfect cylindrical shape on a final product and the consequent reduction of commodity value of a film magazine.

(3) Further, since film magazine 50 formed into a cylindrical shape is fed to the next step by feeding claw 62 as shown in FIG. 6, jamming tends to take place while the film magazine is fed, and transport trouble tends to be caused on feeding claw 62 located on the side of film magazine 50 by unevenness of pile thickness on velvet ribbon 55.

(4) Further, since the film outlet on the cylindrically-shaped film magazine 50 is located on the top of core mould 60 as shown in FIG. 6, its attitude is unstable and feeding claw 62 tends to come off, resulting in transport trouble and crashing of the magazine.

(5) Since the velvet ribbon 55 provided at the film outlet on the cylindrically-formed film magazine 50 is rubbed while the film magazine is transported, pile tend to come off and stick on the internal surface of film magazine 50, resulting in possible contamination of a film loaded in a film magazine and the consequent reduction of photographic characteristics of the film.

SUMMARY OF THE INVENTION

An object of the invention is to provide a film magazine forming apparatus wherein a printed side of a blank sheet is neither rubbed nor scratched while the blank sheet is fed, resulting in no reduction of commodity value of a film magazine.

Above-mentioned object of the invention is achieved by a film magazine forming apparatus for forming a blank sheet almost into a cylindrical shape wherein said blank sheet is transported by a transport member with both a printed side and a reverse side of the blank sheet being kept in touch with the transport member slidingly at both the upper stream side and the downstream side in terms of a flow of the blank sheet against the film magazine forming apparatus for forming the blank sheet almost into a cylindrical shape.

Incidentally, the above-mentioned problems (1)-(5) are solved by a film magazine forming apparatus wherein a core mould, an upper mould a pair of side moulds are provided therein. A blank sheet is transported, with its printed side facing the upper mould, onto the core mould and is subjected to operations of the upper mould and a pair of side moulds to form the most cylindrical shape. A claw for feeding a film magazine formed almost into a cylindrical shape to the next step is provided on the top of the core mould, and the core mould is further formed to be a transport guide for the film magazine formed almost into a cylindrical shape.

BRIEF DESCRIPTION OF THE DRAWINGS

FIGS. 1 and 2 show an example of a film magazine forming apparatus related to the invention wherein FIG. 1 is a perspective view of steps for transporting the boat-shaped blank sheet having thereon a velvet ribbon attached thereto up to the point where it is rounded, and FIG. 2 is a perspective view of primary portions of the film magazine forming apparatus which rounds a boat-shaped blank sheet transported thereto, FIG. 6 is a perspective view of a conventional film magazine forming apparatus in Figures 1 and 2.

Figure 1:
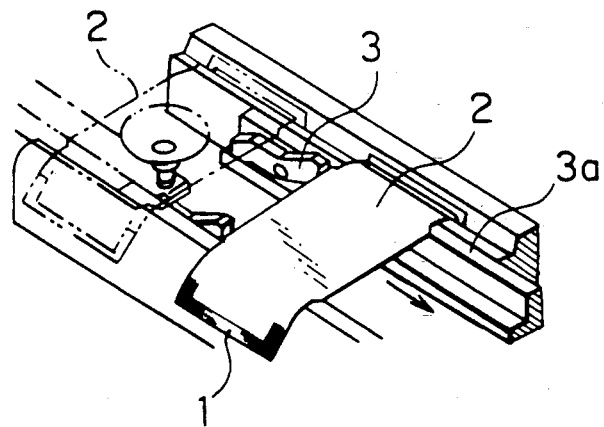

1 ... is a Velvet ribbon
2 ... is a Blank sheet
3 ... is a Transport means
3a ... is a Transport guide
4 ... is a Core mould
5 ... is a Upper mould
6a, 6b ... are Side moulds
7 ... is a Feeding claw

DETAILED DESCRIPTION OF THE PREFERRED EMBODIMENT

Figure 2:
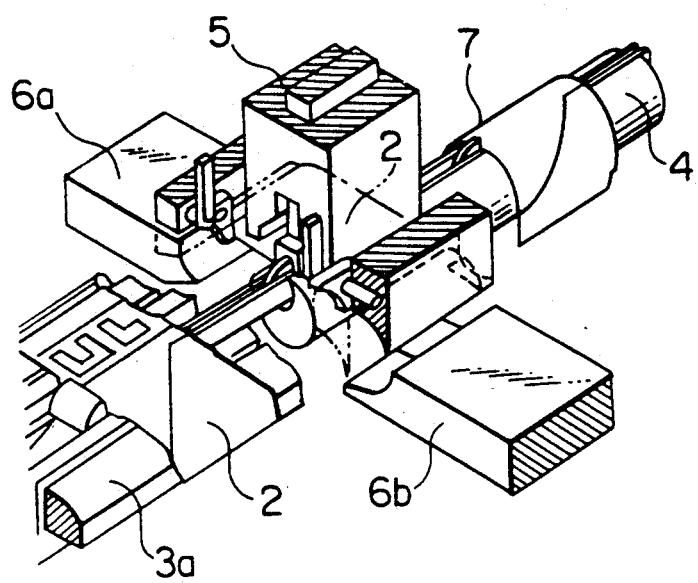
Figure 3:
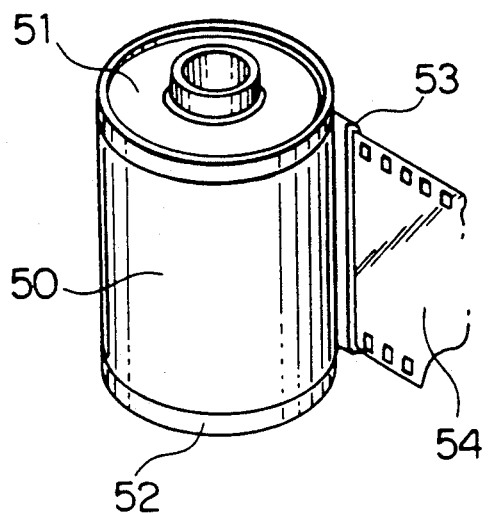
FIG. 3 is a perspective view of prior art a film magazine.
Figure 4:
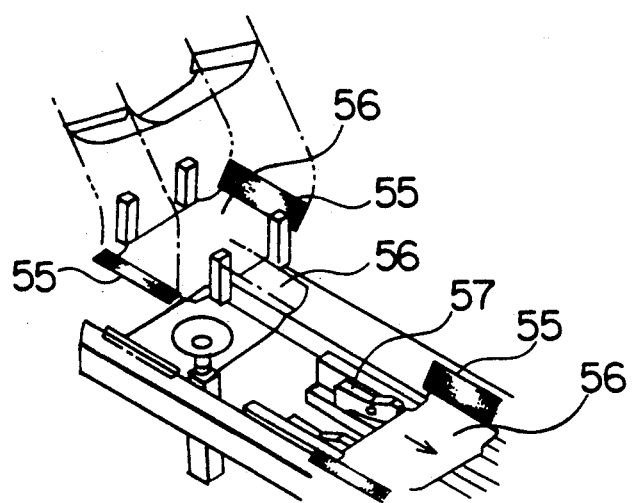
FIG. 4 is a perspective view of steps for transporting the boat-shaped blank sheet having thereon a velvet ribbon attached thereto to the conventional film magazine forming position, FIGS. 5 (a) 5 (b) and 5 (c) represent diagrams showing conventional film magazine forming steps.

FIGS. 1 and 2 show an example of a film magazine forming apparatus according to the present invention, wherein FIG. 1 is a perspective view of steps wherein a boat-shaped blank sheet on which a velvet ribbon is attached is transported up to the film magazine forming position where the boat-shaped blank sheet is rounded, FIG. 2 is a perspective view of primary portions of a film magazine forming apparatus that rounds a transported boat-shaped blank sheet.

From a stack of boat-shaped blank sheets 2 each have a processed portion such as a bent portion at one end thereof and a velvet ribbon pasted thereon, the blank sheet 2 is separated on a one by one basis and is transported through transport means 3 shown in FIG. 1.

Incidentally, in the transport step for blank sheet 2 by means of transport means 3, the blank sheet 2 is transported with its printed side facing upward (i.e., the printed side is not kept in contact with transport guide 3a slidingly).

When the blank sheet 2 is transported onto core mould 4 by means of transport means 3, upper moulds having thereon a concave portion of a circular arc shape and a pair of side moulds 6a and 6b each have concave portion in a circular arc shape are operated, thus the blank sheet 2 is formed to be almost cylindrical by means of a metal mould composed of core mould 4, upper mould 5 and a pair of side moulds 6a and 6b.

Incidentally, in this forming step, the blank sheet 2 is wound round the core mould 4 by means of upper mould 5 and a pair of side moulds 6a and 6b, and in particular, the lip portion (opening) to be a film outlet of a film magazine is positioned just under the core mould 4 when a film magazine is formed.

Therefore, velvet ribbon 1 provided on a lip portion that is a film outlet on a film magazine is positioned under core mould 4 as shown in FIG. 2 and and when the film magazine is transported to the next step by feeding claw 7 provided on core mould 4, the velvet ribbon 1 does not touch core mould 4 that serves as a transport guide.

Since the velvet ribbon 1 provided on a lip portion of a film magazine that is formed to be cylindrical is not rubbed during the period of transportation, the problems that pile tends to come off and stick on the internal surface of film magazine, resulting in possible contamination of a film loaded in a film magazine and the consequent reduction of photographic characteristics of the film are not caused.

Further, since the blank sheet 2 is fed with its printed side facing upward by transport means 3 onto core mould 4, the printed side is not rubbed during the transport thereof by transport guide 3a, and consequently, no damage is caused on the printed side resulting in no reduction of commodity value of a film magazine.

Furthermore, since the blank sheet 2 is formed to be almost cylindrical by means of a metal mould composed of upper mould 5 and a pair of side moulds 6a and 6b all having a concave portion of a circular arc shape and being operated and of the core mould 4, the bent portion shown in FIG. 5 (b) is not caused and a well-shaped cylindrical film magazine can be formed, resulting in a high commodity value of a film magazine.

Since a film magazine formed to be cylindrical is fed to the next step by means of feeding claw 7 provided on the upper portion of core mould 4, no jamming tends to happen during the transportation thereof and the film magazine can surely be transported despite uneven pile thickness of a velvet ribbon, resulting in no transport trouble.

Especially, since a lip portion of a film magazine formed to be cylindrical is positioned under the core mould 4, its attitude is stable preventing the problems that feeding claw 7 comes off to cause transport trouble and crashing of the cylinder.

A film magazine forming apparatus of the present invention is one for forming a blank sheet almost into a cylindrical shape wherein said blank sheet is transported by a transport member with both a printed side and a reverse side of the blank sheet being kept in touch with the transport member slidingly at both the upper stream side and the downstream side in terms of a flow of the blank sheet against the film magazine forming apparatus for forming the blank sheet almost into a cylindrical shape. It is therefore free from the problems that the printed side of a blank sheet is rubbed and is consequently damaged while it is transported, causing the reduction of commodity value, which is an advantageous point of the invention.

What is claimed is:

1. A film magazine forming apparatus for forming a sheet having printing on a side thereof into an almost cylindrical shape, the film magazine forming apparatus comprising:

supply means for supplying sheet having a shape for forming into a film magazine;

transport means for transporting the sheet from the supply means;

forming means for forming the sheet into the almost cylindrical shape with the printing on the side of the sheet forming an outer cylindrical surface of the almost cylindrical shape, said forming means including:

a core mold, an upper mold, and first and second side molds; and moving means for moving the upper mold and the first and second side molds to form the almost cylindrical shape around the core mold so that said upper mold and first and second side molds surround said core mold when the transport means moves the sheet to a position between said molds;

the transport means transporting the sheet with the printed side of the sheet being out of contact with and facing away from the transport means; and wherein the core mold extends beyond the surrounding relationship of said upper mold and said first and second side mold so that said core mold also acts as a guide for transporting the thus formed almost cylindrical shape film magazine when said magazine is entirely out of all of said molds to another operational position.

2. The apparatus according to claim 1, further comprising a claw mounted on the core mold for transporting the thus formed almost cylindrical shape to the another operational position.

3. A film magazine forming apparatus for forming a sheet having printing on a side thereof into an almost cylindrical shape, the film magazine forming apparatus comprising:
- supply means for supplying sheet having a shape for forming into a film magazine;
- transport means for transporting the sheet from the supply means;
- forming means for forming the sheet into the almost cylindrical shape with the printing on the side of the sheet forming an outer cylindrical surface of the almost cylindrical shape, said forming means including:
  - a core mold, an upper mold, and first and second side molds; and
  - moving means for moving the upper mold and the first and second side molds to form the almost cylindrical shape around the core mold so that said upper mold and first and second side molds surround said core mold when the transport means moves the sheet into a position between said molds;
- the transport means transporting the sheet with the printed side of the sheet being out of contact with and facing away from the transport means; and
- a claw means mounted on the core mold and movable through the forming means for transporting the thus formed almost cylindrical shape from between the core mold and the upper mold and the side mold to another operation position.

4. A film magazine forming apparatus for forming a sheet having printing on a side thereof into an almost cylindrical shape, the film magazine having spaced apart lip portions for enabling a film to move therebetween, the lip portions having a soft yarn mounted thereon, the film magazine forming apparatus comprising:
- supply means for supplying sheet having a shape for forming into a film magazine;
- transport means for transporting the sheet from the supply means;
- the transport means transporting the sheet with the printed side of the sheet being out of contact with the transport means;
- forming means for forming the sheet into the almost cylindrical shape with the printing on the side of the sheet forming an outer cylindrical surface of the almost cylindrical shape with the lip portions being at a bottom portion of the thus formed cylindrical shape so that the lip portions face downward, said forming means including:
  - a core mold, an upper mold, and first and second side molds;
  - moving means for moving the upper mold, and the first and second side molds to form the almost cylindrical shape around the core mold so that upper mold and first and second side molds surround said core mold when the transport means moves the sheet between the molds;
- the core mold also acting as a guide for transporting the thus formed almost cylindrical shape to another operational position; and
- a claw mounted on the core mold and movable through the forming means for transporting the thus formed almost cylindrical shape along the core mold to another operational position.

* * * * *